United States Patent [19]
Gloshinski et al.

[11] 3,393,676
[45] July 8, 1975

[54] MAGNETIC CHUCK

[75] Inventors: Leon J. Gloshinski, Northboro; Donald R. Johnson, Worcester, both of Mass.

[73] Assignee: Cincinnati Milacron-Heald Corp., Worcester, Mass.

[22] Filed: Jan. 17, 1974

[21] Appl. No.: 433,988

[52] U.S. Cl. ................ 279/1 M; 51/237 R; 269/8
[51] Int. Cl. ..... B23b 31/10; B25b 11/00; B24b 5/02
[58] Field of Search ........ 51/237 R; 269/8; 279/1 M

[56] References Cited
UNITED STATES PATENTS

| | | | |
|---|---|---|---|
| 1,013,574 | 1/1912 | Walker | 269/8 X |
| 1,212,555 | 1/1917 | Pragst | 269/8 X |
| 1,389,272 | 8/1921 | Scaife | 51/237 R |
| 2,883,197 | 4/1959 | Gotha | 279/1 M |
| 2,893,551 | 7/1959 | Pirwitz | 269/8 |
| 2,924,917 | 2/1960 | Rice | 51/237 R |

OTHER PUBLICATIONS

American Machinist – March 10, 1949 – page 192.

*Primary Examiner*—Donald G. Kelly
*Assistant Examiner*—Marc R. Davidson
*Attorney, Agent, or Firm*—Norman S. Blodgett; Gerry A. Blodgett

[57] ABSTRACT

A machine tool having a magnetic backing plate with segmented elements.

3 Claims, 7 Drawing Figures

MAGNETIC CHUCK

BACKGROUND OF THE INVENTION

In the design and manufacture of backing plates for machine tools, particularly for the internal grinding of bores, it is common practice to provide an electro-magnetic coil within the housing of the machine tool and to bring the electro-magnetic lines of force out into the workpiece to hold it tightly against the backing plate. In order that the backing plate may hold the workpiece effectively, the contact point between the workpiece and the backing plate must be such as to introduce the maximum number of lines of force into the workpiece. This means that in most cases it is necessary to provide a backing plate that is specifically designed and made for a specific workpiece. In the use of a grinding machine it is necessary to convert the machine from one type of workpiece to another quite rapidly lest the machine be subject to the economic loss occasioned by down-time. Furthermore, the design, manufacture, and storage of individual backing plates for each specific workpiece that is to be ground is quite expensive. These and other difficulties experienced with the prior art devices have been obviated in a novel manner by the present invention.

It is, therefore, an outstanding object of the invention to provide a machine tool having a magnetic backing plate which is readily converted from one workpiece size to another.

Another object of this invention is the provision of a machine tool having a magnetic backing plate which is readily converted to different sizes without upsetting the critical air gaps necessary to introduce the lines of force into the backing plate.

A further object of the present invention is the provision of a backing plate consisting of a first element which remains permanently in place to establish proper air gaps and to convert magnetic field from concentric gap to radial pole and a second element which is interchangeable with it to provide proper contact areas for a specific workpiece.

It is another object of the instant invention to provide a method of forming the contact lip of a magnetic backing plate, which method is inexpensive and readily performed by unskilled labor.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a housing with an annular electro-magnetic coil mounted therein and a rotatable spindle mounted in the housing concentrically of the coil. A first backing plate element is mounted on the spindle and rotatable with it, while a second backing plate element is mounted on the first backing plate element and has an axially-extending lip for contact with the workpiece.

More specifically, the first element is provided with an axially-extending boss, while the second element is provided with a recess to receive the boss, the elements being held in face-to-face relationship. The elements are divided into segments which are insulated from one another in such a way that the first element directs lines of force of a first polarity into certain of the segments of the second element and directs lines of force of the other polarity into the remainder of the segments of the second element.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
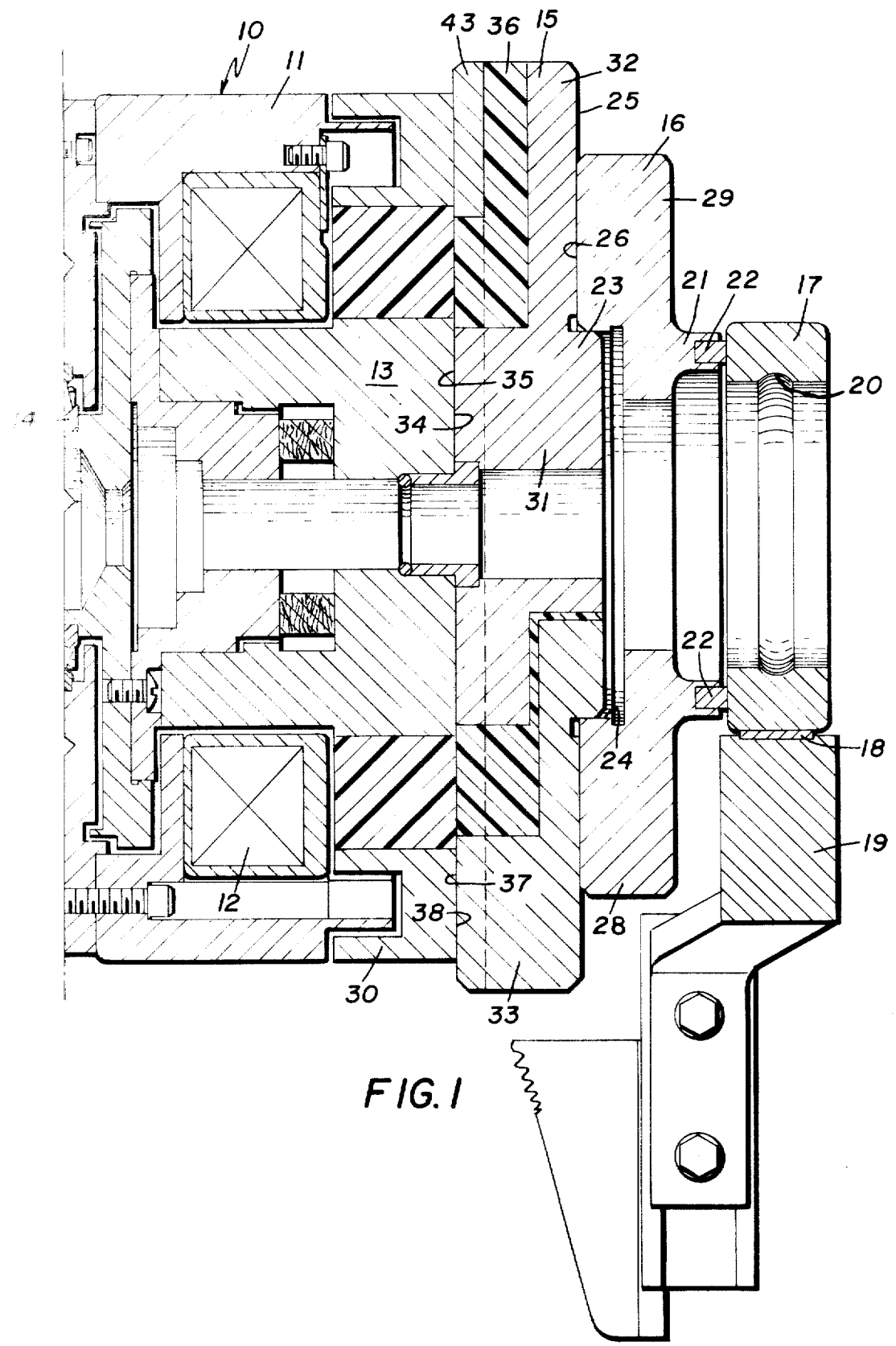
FIG. 1 is a vertical sectional view of a machine tool incorporating the principles of the present invention taken on the line I—I of FIG. 2.

Referring first to FIG. 1, wherein are best shown the general features of the invention, the machine tool, indicated generally by the reference numeral 10, is shown as having a housing 11 in which is fixedly mounted an annular electro-magnetic coil 12. A rotatable spindle 13 is mounted in the housing and carried in the usual bearings 14 concentrically of the coil 12. Mounted on the spindle and rotatable therewith, is a first backing plate element 15 and a second backing plate element 16 contacting and driving an annular workpiece 17. In the preferred embodiment, this workpiece is shown as the outer race of a ball bearing and is supported by contact of its outer periphery with a hardened metal shoe 18 carried in a support 19 which is bolted to the housing 11. The second element 16 is provided with an axially-extending lip 21, which is provided with a plurality of carbide contact elements 22, these elements being arcuate in nature and arranged in an annular path to contact practically the entire face of the workpiece 17 to provide the maximum frictional contact with the workpiece and also the maximum contact for purposes of introducing lines of force originating in the electro-magnetic coil 12.

The first element 15 is provided with an axially-extending boss 23, while the second element 16 is provided with a bore or recess 24, so that the elements 15 and 16 fit together in face-to-face relationship and can be held together by suitable bolts. More specifically, the first element 15 is provided with a radial face 25 facing to the right (in FIG. 1), while the second backing plate is provided with a flat radial face 26 facing to the left. The two faces come in intimate contact to provide for the optimum transmission of magnetic lines of force between the two.

Figure 2:
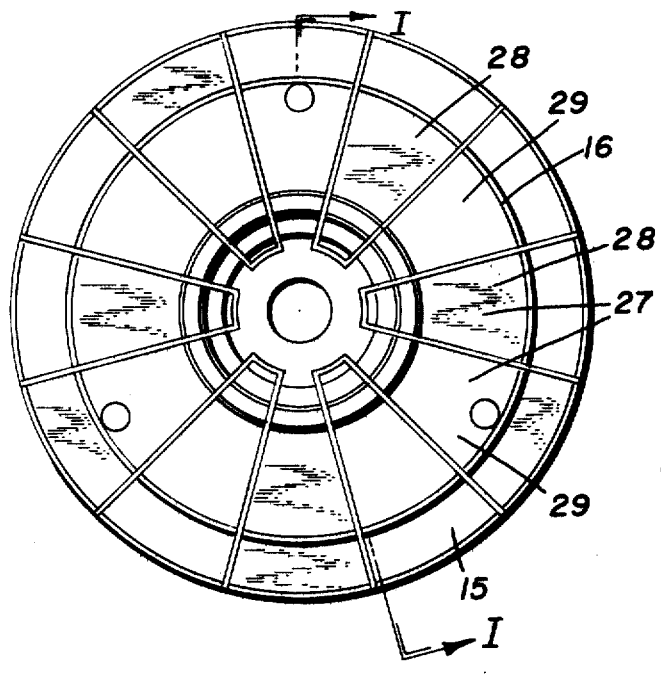
FIG. 2 is a side elevational view of the machine tool.

Referring to FIG. 2, it can be seen that the second element 16 is divided into segments 27 subtending angles of 30°, so that there are 12 segments in all. In the preferred embodiment, North pole segments 28 alternate with South pole segments 29 around the entire circumference of the element. In a similar way the first element 15 is divided up into 30° segments, but in an entirely different way, as will be described more fully hereinafter.

Figure 4:
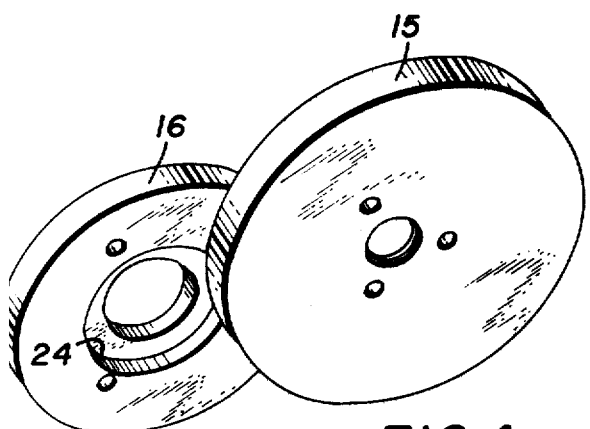
FIG. 4 is an exploded view of the backing plate observed from the other side.
Figure 3:
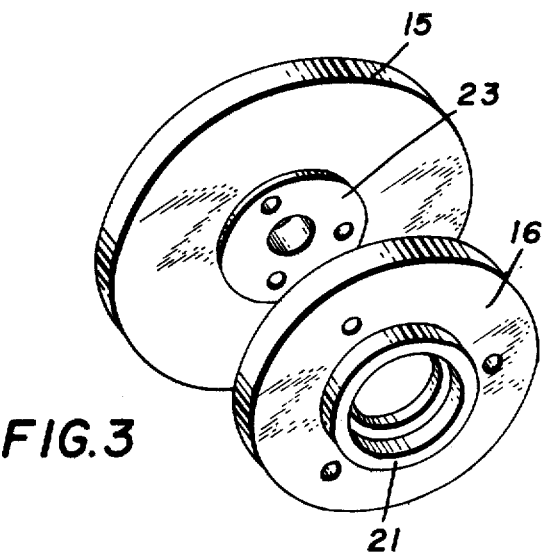
FIG. 3 is an exploded view of two elements of an electro-magnetic backing plate as viewed from one side.

As shown in FIG. 3, the first element 15 and the second element 16 are joined by the boss 23. FIG. 4 shows best the recess 24 into which the boss 23 fits.

Figure 5:
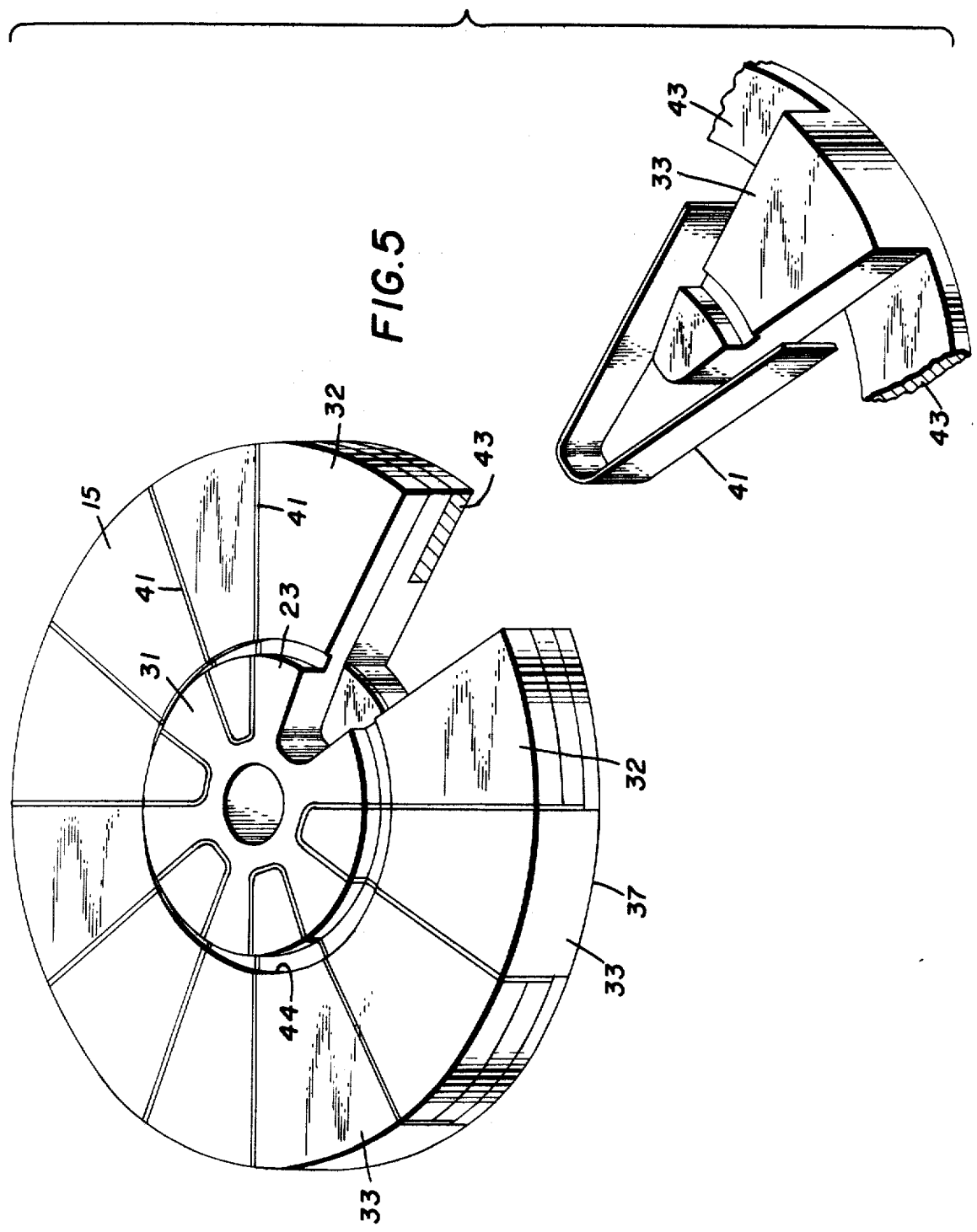
FIG. 5 is a perspective view of a first element of the backing plate.

FIG. 5 shows the details of the first element 15. It is provided with a central hub 31 from which extend integral arms 32. These arms are generally defined by 30° sides of general wedge shape and between each pair of arms lies a segment 33. Referring to FIG. 1, it can be seen that the end of the spindle 13 is provided with a radial flat face 34 against which is pressed a similar radial flat face 35 of the hub 31. Insulating material of a plastic nature forms a body 36 which insulates the hub 31 and its integral arms 32 (which are all formed of a magnetic material) from the housing 11. This is all shown in the upper half of FIG. 1. The lower half of FIG. 1 shows the manner in which the segments 33 are provided with flat radial faces 37 which lie closely adjacent to a similar flat radial face 38 formed on a ring 30. There is a suitable contact between the faces 37 and 38, through which the magnetic lines of force can extend. An air gap is provided between the ring 30 and the housing 11.

Figure 6:
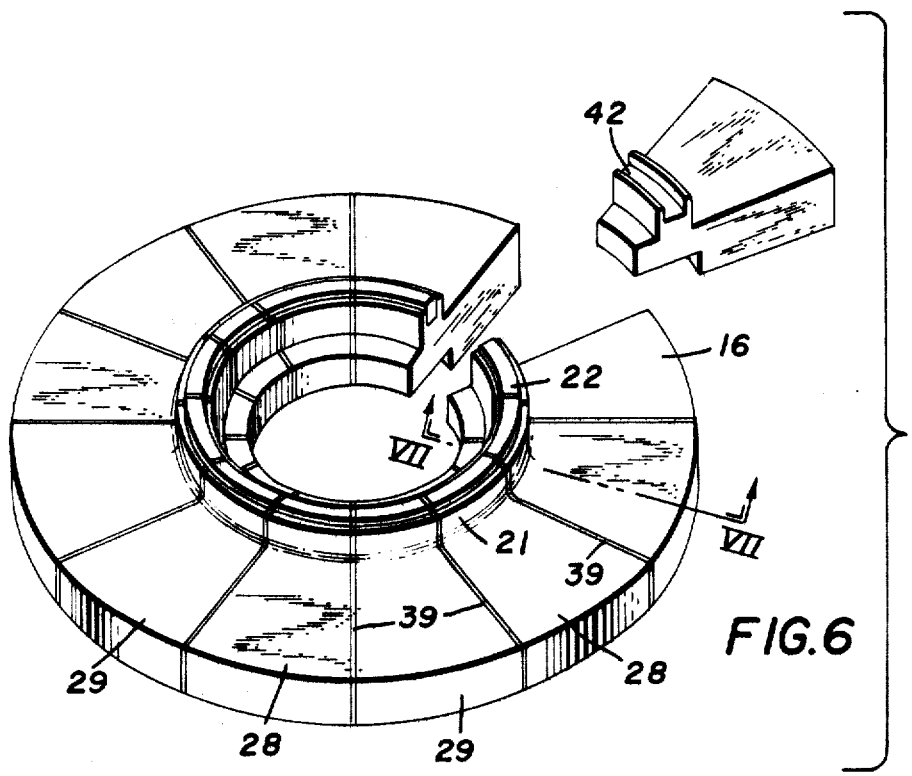
FIG. 6 is a perspective view of a second element of the backing plate.

In FIG. 6 are shown the details of the second element 16, including the lip 21 and the carbide elements 22. The north pole segments 28 are separated from the south pole segments 29 by strips 39 of magnetically insulating material, such as brass, which is brazed to the magnetic metal in the segments 28 and 29. Referring to FIG. 5, the arms 32 and the hub on the one hand are also separated from the segments 33 in the same manner, i.e., by use of brass strips 41. A ring 43 joins the segments 33 and it is this ring on which the ring 30 is mounted.

It can be seen then from the above description that the philosophy of the present invention involves providing a permanent element 15 which is accurately located on the spindle 13 by engagement of the face 35 with the face 34. This establishes a suitable air gap between the ring 30 and the housing 11 at the outer periphery. The size of this air gap must be large enough to allow free rotation of the spindle and the removal of any problems with dust and grinding slurry and yet small enough so that the electro-magnetic lines of force can pass through it readily. On the other hand, the second element 16 is made and designed to be removable and to have a lip 21 with suitable carbide segments 22 of such a size and shape as to conform to the particular workpiece 17 which is to be machined. In this case, the machine tool is shown as an internal grinding machine for grinding the bore 20 of the workpiece 17, using the centerless grinding technique involved in supporting the workpiece by means of the shoe 18. It can be seen from the drawings that the lip 21 and its carbide contact elements 22 provide a wide, large area contact with the face of the workpiece 17 which they engage. It can be particularly seen in FIG. 1 that the housing 11 is arranged to act as a north pole, while the spindle 13 is arranged to act as a south pole. This means that the lines of force leaving the coil 12 pass from the housing 11 into the rings 30 and 43 and into segments 33 of the first element 15. From there they pass into the north pole segments 28 of the second element 16. They flow outwardly through the portions of the lip 21 associated with the north pole segments 28 of the second elements 16 and the carbide elements 22 associated therewith, into the workpiece 17 and pass circumferentially around to the next adjacent south pole segments 29. From the south pole segments of the elements 16, the lines of force flow through into the arms 32 of the first element 15 and into the hub 31 thereof. Since the hub 31 is pressed tightly against the face 34 of the spindle 13, the south pole lines of force pass into the spindle 13 and swing around to connect through an air gap into the housing 11 to complete the circuit. The suitable air gap between the housing 11 and the outer surface of the spindle 13 allows passage of the magnetic lines of force, while permitting free rotation of the spindle within the housing.

Figure 7:
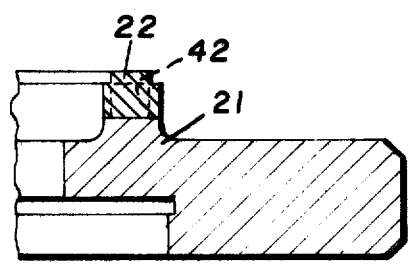
FIG. 7 is a sectional view taken on the line VII—VII of FIG. 6.

The manner in which the carbide segments 22 are applied to the lip 21 is unusual and is best described in connection with FIGS. 6 and 7. An annular carbide element is formed and is cemented into a suitable groove 42 formed on the face of the lip 21. Then, a thin diamond saw is used to cut through the elements and the lip to divide them into segments in the manner shown. Epoxy plastic is then introduced to maintain the segments in insulated condition. In this way the annular carbide element is readily formed and is supplied to the backing plate very easily, while manufacture of the segments 22 separately and accurately would be very difficult and expensive. Note, that the face of the first element 15 is provided with a groove 44 surrounding the boss 23 to allow closer relationship between the facing portions of the first element 15 and the second element 16 when they are assembled.

It is obvious that minor changes may be made in the form and construction of the invention without departing from the material spirit thereof. It is not, however, desired to confine the invention to the exact form herein shown and described, but it is desired to include all such as properly come within the scope claimed.

We claim:
1. A machine tool, comprising
   a. a housing having an annular electro-magnetic coil mounted therein,
   b. a rotatable spindle mounted in the housing concentrically of the coil,
   c. a first backing plate element mounted on the spindle and rotatable with it, the first element being provided with a central hub from which integral arms extend outwardly to provide a first pole, there being segmental inserts located between the arms and being held fixedly in place and insulated from the arms to form second poles,
   d. a second backing plate element mounted on the first backing plate element and having an axially-extending lip for contact with a workpiece, the second element being provided with an axial bore concentric with the said lip and being divided into a plurality of segments by radial layers of insulation, the segments being alternately first poles and second poles to match the arms and inserts, respectively, of the first element, the first element being provided with an axially-extending boss, while the second element is provided with a recess to receive the boss, the elements being held in face-to-face relationship,
   consisting of an annular element inserted in a groove on the lip that is concentric with the bore and consisting of a plurality of hardened inserts separated by narrow gaps which are filled with material that acts as an insulation to electro-magnetic lines of force.

2. A machine tool as recited in claim 1, wherein the arms and inserts of the first element and the segments of the second element are separated by strips of material which act as insulation against the passage of electro-magnetic lines of force between the adjacent inserts and between the adjacent segments.

3. A machine tool as recited in claim 2, wherein the housing, spindle, arms, hub, inserts, and segments are formed of magnetizable material, and wherein the insulating material is in the form of brass strips which are brazed to the magnetizable material.

* * * * *